Aug. 1, 1933.   H. E. LAFAYETTE   1,920,408
COUPLING DEVICE
Filed July 13, 1931   2 Sheets-Sheet 1

INVENTOR.
Harvey E. Lafayette
BY Lancaster, Allwine & Rommel
ATTORNEYS.

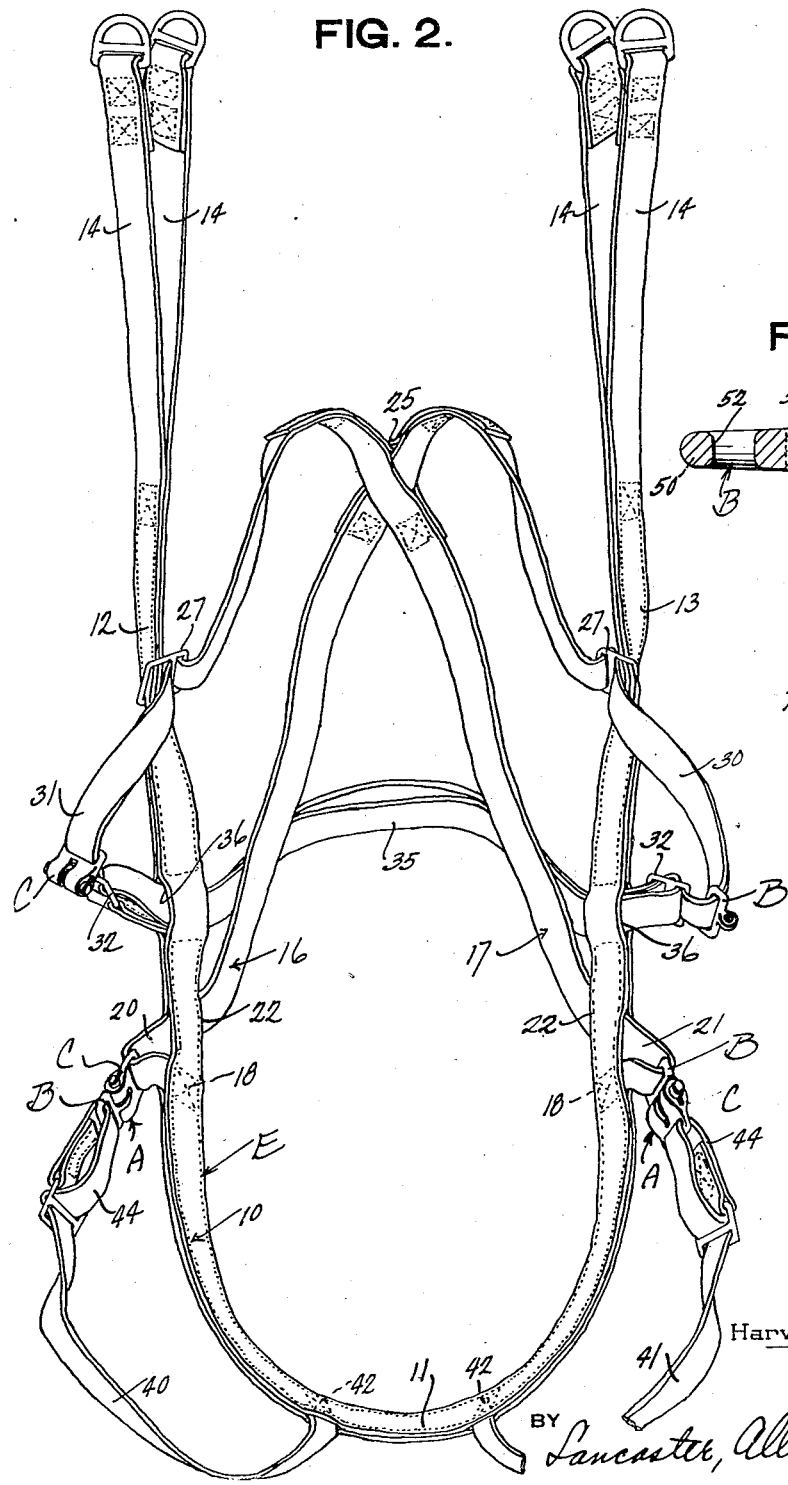
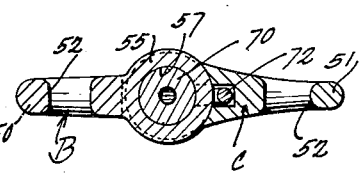
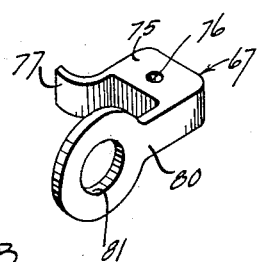

Patented Aug. 1, 1933

1,920,408

UNITED STATES PATENT OFFICE 1,920,408

COUPLING DEVICE

Harvey E. Lafayette, Waukegan, Ill., assignor to Irving Air Chute Company, Inc., Buffalo, N. Y., a Corporation of New York Application July 13, 1931. Serial No. 550,578

29 Claims. (Cl. 24—230)

This invention relates to improvements in couplings for detachably holding straps, webbing, and the like together.

The primary object of this invention is the provision of an improved coupling connection for parachute harnesses which may be operated with ease; one that is fool-proof in that the same cannot be accidentally tripped, but contemplates the manual operation of dual parts to cause a release of the interfitting parts of the coupling, and one that will conform to the harness and the body of a wearer in a comfortable relation. In these respects the improved coupling differs materially from the conventional type of snap fitting coupling for standard parachute harness.

A further object of this invention is the provision of parachute harness having the improved fittings associated therewith in a relation that will insure the expeditious attachment or detachment of the parts, to enable the aviator to don and doff the harness with facility.

A further object of this invention is the provision of an improved metal coupling which may find general application for the holding of straps or webbing ends together, in a safe, comfortable, and efficient relationship.

Other objects and advantages of this invention will be apparent during the course of the following detailed description.

In the accompanying drawings, forming a part of this specification; and wherein similar reference characters designate corresponding parts throughout the several views:

Figure 2 is a perspective view of the harness as shown in Figure 1, but with the same opened and showing the relationship of the parts of the improved fittings.

Figure 6 is a transverse sectional view taken through the improved coupling parts substantially on the line 6—6 of Figure 4.

Figure 7 is a perspective view of a detent member which holds the plunger mechanism of the coupling inoperative and the parts of the coupling locked together until manipulated to permit a depression of the plunger and a release of the parts.

Figure 1:
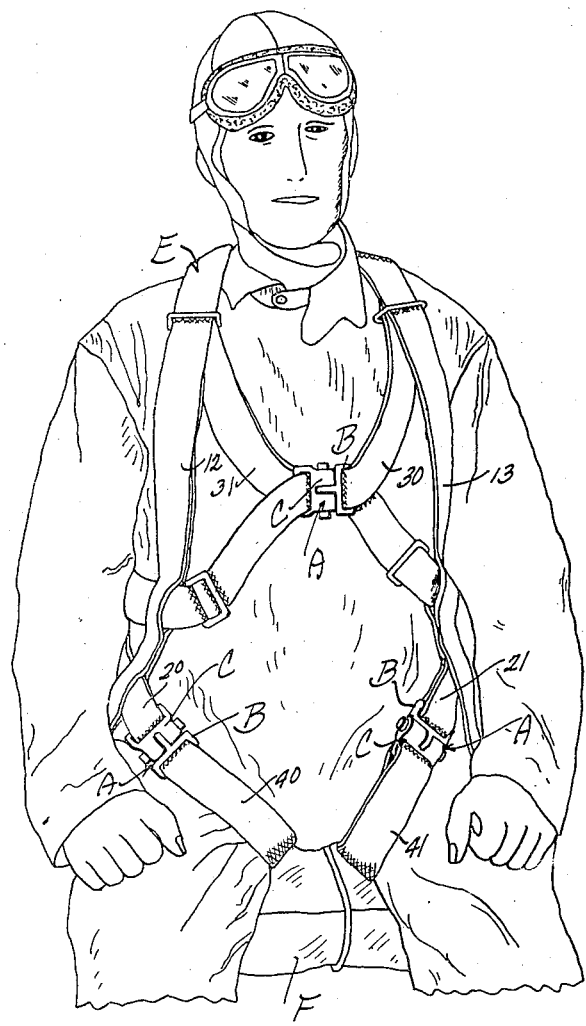
Figure 1 is a front view of an aviator wearing the standard type of parachute harness, but showing the improved couplings associated therewith for retaining the harness about the body and legs of the wearer.
Figure 3:
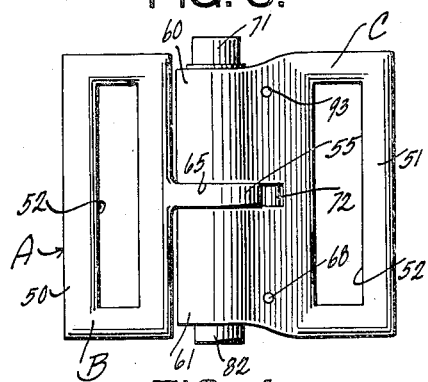
Figure 3 is an elevation showing the improved coupling, with the parts interconnected.

In the drawings, wherein for the purpose of illustration is shown only a preferred embodiment of the improved coupling, and it preferred association with a conventional type of parachute harness, the letter A may generally designate the improved coupling, which may consist of parts B and C having plunger mechanism D associated therewith for releasably holding them together. An improved detent E is cooperatively associated with the parts and the plunger mechanism to hold the plunger mechanism in operative position. The improved coupling A is shown in association with a parachute harness, of a conventional type. In this type of harness three of the couplings are used, as shown in Figure 1. One of them is used to hold the harness about the upper part of the wearer, and the other two are used for holding the harness straps about the legs of the wearer.

Referring to the harness E, the same generally comprises a U-shaped sling 10, which is preferably formed of double thicknesses of straps or webbing sewed together to provide a seat 11 to which the parachute pack is connected, in case a "seat type" is worn. This pack is shown at F in Figure 1 of the drawings. The sling 10 furthermore includes the riser portions 12 and 13 terminating in the suspension straps 14 at the free ends thereof, to which the shroud lines of the parachute are connected in the conventional manner. For attaching the harness upon the upper part of the body straps 16 and 17 are provided, secured at 18 to the opposite sides of the U-shaped sling 10, above the seat portion 11; these strap portions 16 and 17 being looped forwardly at 20 and 21 respectively; the loops 20 and 21 either being of fixed size or adjustable, since the straps 16 and 17 may be slidably connected at the location 22, in lieu of being stitched between the webs of the U-shaped sling, as shown. The strap portions 16 and 17 extend diagonally upward at the rear of the harness; being adapted to extend diagonally upward across the back of the wearer, and they are adjustably crossed at 25 and then extended divergently upward and forward for extension across the shoulders and to the front of the wearer, and are adjustably connected by usual buckles 27 to the riser portions 13 and 12 respectively of the harness. The straps 16 and 17 are then respectively looped upon the riser portions 13 and 12 respectively, at 30 and 31; these loops being adjustable as to size by reason of the fact that the straps 16 and 17 are overlapped at their ends about the sides and across the small of the back of the wearer, and adjustably connected to each other by buckles 32 to produce this effect. It is understood that the overlapped portions of these straps 16 and 17, compressing the adjustable back belt 35, are adjustably threaded through suitable loop openings 36 between the web portions of the U-shaped sling 10, as is shown in Figure 2.

Leg encircling straps 40 and 41 are fixedly attached at 42 on the seat portion 11 of the sling 10, and are adapted to be extended between the legs of the wearer and brought about the legs in an encircling manner and at their free ends are adapted for attachment by the improved fittings A with the loops 20 and 21 of the harness above mentioned. These leg encircling straps 40 and 41 are provided with adjusting means 44 at their free ends, in the nature of a loop thru which one part of the improved coupling A is threaded; the other part of the coupling being threaded to the harness loop 20 or 21, as the case may be.

Referring to the improved coupling or fitting A, the parts B and C include the substantially rectangular shaped rather flat loop portions 50 and 51, each defining an elongated narrow opening 52 therein, through which the webbing or strap material of the harness is threaded either for adjustment or affixed to the outer bar of the loop portions 50 or 51, as the case may be. Between its ends the part B is provided with an apertured extension 55, which is of ring-shaped formation, and lies in a plane at right angles to the plane of the loop 50. It is positioned about midway between the ends of the loop 50 and is integrally connected therewith. This extension 55 has a locking plunger receiving opening 57 therein.

Figure 4:
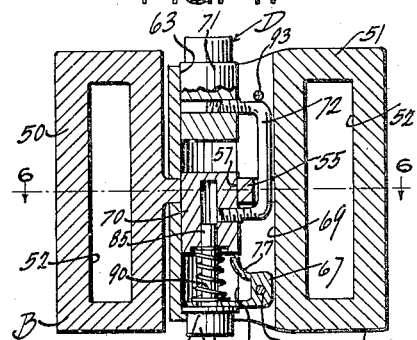
Figure 4 is a sectional view taken through the plane of the fitting with the parts relatively connected and in locked relation.

The part C of the improved fitting has one bar portion thereof provided with a pair of relatively spaced and aligning barrel-shaped portions 60 and 61 which are provided with aligning passageways 62 and 63 therethrough. At their facing ends the barrel portions 60 and 61 are spaced to provide a socket 65 which is adapted to receive the male extension 55 of the part B, as is shown. The plunger mechanism D is mounted to reciprocate in the aligning passageways 62 and 63, across the space 65, and is adapted to extend through the opening 57 of the extension 55 of the fitting part B in order to lock the parts B and C together, as is shown in Figure 4 of the drawings.

The plunger mechanism D consists of a locking plunger 70 and an operating plunger 71, slidable in the passageways 62 and 63 of the part B, and being connected together by means of a U-shaped metal member 72. The detent construction E is cooperatively related to the plunger mechanism D and it includes a detent proper 67 pivoted at 68 in an offset passageway 69 which communicates with and extends radially along the passageways 62 and 63, but is relatively narrow. This detent member 67 is shown in perspective in Figure 7, and includes a relatively flat body portion 75 with an opening 76 in which the pin 68 is received to pivot the detent. At one end the body 75 is provided with a detent arm 77, which under certain circumstances extends into the passageway 62 in the path of movement of the main locking plunger 70 to prevent the latter from being retracted from its locking extension across the opening 65. At its other end the body 75 of the detent 67 is provided with an arm 80, ring-shaped at its free end and providing an opening 81. A detent operated plunger 82 is reciprocably disposed in the outer end of the passageway 62, the same having a head thereon with an enlarged annular flange 83 adapted to abut against an internal shoulder within the passageway 62 to limit the outward movement of the plunger 82 from the barrel portion 61 above mentioned. This detent operating plunger has a reduced stem 85 axially thereon which extends through the opening 81 of the detent arm 80, and it receives thereon a conical shaped spiral spring 90 which at one end engages the arm 80 and at the opposite end engages the locking plunger 70 to normally urge the detent 67 into a locking position. It also urges the plunger mechanism as far away from the detent operating plunger 82 as it is possible to do so. The limit of the movement of the plunger mechanism D away from the detent is determined by abutment of one end of the U-shaped connecting member 72 against a detachable pin 93 which is carried by the member C in transverse intersecting relation with the reduced passageway 69, as shown in Figure 4.

Figure 5:
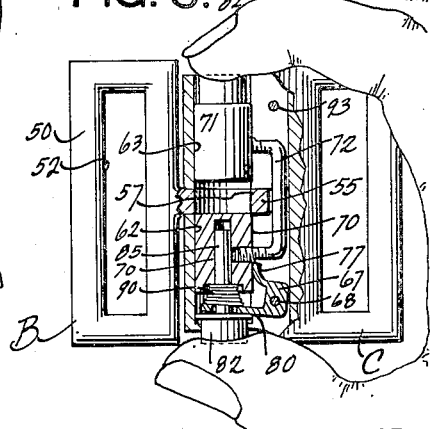
Figure 5 is a view showing an operator depressing the detent and plunger mechanism to enable a relative release of the parts of the coupling.

With the locking extension 55 of the part B in the socket opening 65 of the part C, it is noted that the opening 57 aligns with the passageways 62 and 63. In this position of parts the spring 90 will so hold the detent that the arm 77 will extend into the passageway 62. This spring 90 also forces the main locking plunger 70 in a direction away from the detent across the socket 65 with a portion of its end partially extending into the passageway 63. Thus, the locking plunger 70 extends through the passageway 57 and very effectively locks the parts B and C together. It is to be noted that there is a space between the facing ends of the operating plunger member 71 and the locking plunger 70, so that upon depression of the member 71 by an operator this space may align flush with the socket 65 to permit a detachment of the parts B and C, as is shown in Figure 5.

It is readily apparent from the foregoing that the improved coupling has a high safety factor, by reason of the fact that it is necessary to operate two plunger mechanisms from opposite ends of the fitting at the same time before the parts B and C may be released. Thus, it is necessary to press the plunger 82 so as to rock the detent 67 upon its pivot pin 68 and remove the arm 77 from the reciprocating path of the main locking plunger 70. At the same time the depression of the plunger member 71 will cause a movement of the locking plunger 70 from across the socket 65, so that the parts B and C may be removed with respect to each other. The release positions and the operation and relative association of the parts, during depression of the two plungers, is shown in Figure 5, and it is quite obvious that the parts B and C may then be readily disconnected.

The plunger mechanism may be readily disassembled from the part C merely by knocking out the pins 68 and 93. They are frictionally held in position in their openings in the part C. It is to be noted from Figure 4 that the connecting stirrup 72 is screw threaded at its ends and adjustably receives the plunger members 70 and 71, so that the latter may be properly aligned and adjusted without liability of binding. It is noted that this stirrup 72 slides along the narrow passageway 69, so that there will be no turning of the plunger members 70 and 71 in their respective circular passageways 62 and 63.

With respect to the application of the improved couplings A upon the harness E, it is noted that one of them takes care of the releasable enclosure of the harness loops 30 and 31 across the front of the aviator. The coupling has the parts B and C relatively threaded upon the loops 30 and 31 respectively. This places the part C at the right side of the aviator, so that he may with facility press the plunger portions thereon to enable a quick release of the parts B and C from their locked position shown in Figure 1. This is also true of the arrangement of the couplings A upon the leg encircling and connecting straps. One of the couplings A has the parts B and C thereof respectively connected with the end of the leg strap 40 and the harness loop 20, as shown in Figure 2, to releasably hold the strap 40, in combination with a portion of the sling of the harness, in a leg encircling relation. Similarly, one of the fittings A has the parts B and C thereof respectively connected with the loop 21 and the end of the leg strap 41. In all of these couplings A the part C is at the right hand side of the aviator, where the same is most conveniently positioned for quick operation by a right-handed aviator. If desired the relative position of these parts may be reversed or rearranged to suit.

It is to be noted from the drawings and the above description that the parts B and C are relatively pivoted so as to lie flat against the body of the wearer. There are no projecting portions which dig into the body of the wearer. Therefore, there will be no discomfort directly caused by the fittings or couplings A, as is the case with the present type of snap fastener. The parts of the fittings are freely threaded upon the various straps with which they are respectively associated, so that the harness may be readily adjusted.

It is of course to be distinctly understood that the improved coupling may be used in any location desired upon a parachute harness, and may be used upon any of the various parachute harnesses now in use. In fact, the use of the improved coupling is not to be limited to an application upon parachute harnesses, although it has been primarily designed for such utilization as an aid to the comfort, safety, and facility in doffing and donning such harness.

Various changes in the shape, size, and arrangement of parts may be made to the form of invention herein shown and described, without departing from the spirit of the invention or the scope of the claims.

I claim:

1. In a coupling the combination of a pair of complementary connecting parts having apertured connecting portions, a locking pin for releasable extension through the openings to connect said parts, and plunger actuated pivoted detent means for normally holding said locking pin in a locking connection of said coupling parts.

2. In a coupling the combination of a pair of complementary coupling parts including strap connecting loops and apertured connecting portions, a locking pin for releasable extension in the apertures for connecting said parts together, and pivoted detent means for normally holding said locking pin in locking position with respect to both of said parts.

3. In a coupling the combination of a pair of complementary connecting parts, one of said parts having spaced portions provided with aligning passageways therein, and the other portion having an apertured extension for releasable projection into the space between said spaced portions of the first mentioned part to align the aperture thereof with the passages of the portions of the first mentioned part, and manually actuated plunger means carried by the passageway portions of the first mentioned part for releasably extending into the aperture of the extension of the second mentioned part.

4. In a coupling the combination of a pair of complementary connecting parts, one of said parts having spaced portions provided with aligning passageways therein, the other portion having an apertured extension for releasable projection into the space between said spaced portions of the first mentioned part to align the aperture thereof with the passages of the portions of the first mentioned part, manually actuated plunger means carried by the passageway portions of the first mentioned part for releasably extending into the aperture of the extension of the second mentioned part, and detent means normally holding said plunger means in a locking connection of said parts.

5. In a parachute harness coupling the combination of a pair of interfitting complementary parts, a locking plunger carried by one of said parts for locking the other part thereto, a detent, and a single spring means actuating both the plunger and the detent for holding the plunger in a locking connection of said parts and holding the detent in a releasable restraining position with said plunger to prevent an accidental release operation of the latter.

6. In a coupling construction the combination of a pair of relatively flat and thin complementary male and female connecting parts, spring actuated plunger means normally positioned to hold said parts in connected relation, and spring actuated detent means to normally prevent a release operation of the plunger means.

7. As an article of manufacture a coupling part comprising a body having a pair of relatively spaced portions with aligning apertures therein opening into the said space, and a plunger mechanism reciprocably carried by said part including plunger portions operable in the apertured portions of said part, and a connection between said plunger portions laterally spaced from the space between said apertured portions, and means normally urging said plunger means in position so that one of said plunger portions lies in a locking extension across the space between the said apertured portions.

8. As an article of manufacture a coupling part comprising a body having a pair of relatively spaced portions with aligning apertures therein opening into the said space, a plunger mechanism reciprocably carried by said part including plunger portions operable in the apertured portions of said part, and a connection between said plunger portions laterally spaced from the space between said apertured portions, means normally urging said plunger means in position so that one of said plunger portions lies in a locking extension across the space between the said apertured portions, and detent means for holding the said plunger means in locking position.

9. In a coupling the combination of a connecting part having a strap attaching body and a transversely extending apertured extension, a second coupling part having an attaching body and a pair of relatively spaced portions apertured in aligning relation in intersection with the space therebetween, said space being sufficient to receive therein the apertured extension of the first mentioned coupling part to align the aperture thereof with the apertures of the second mentioned part, a pair of plunger portions reciprocably carried in the apertured portions of the second mentioned part and having a connection laterally removed from the aligning apertures of said part so that one of said plunger parts may be moved into a locking extension across the space between the said apertured portions of the second mentioned part in order to lock said parts together, said plungers being spaced so that they may be positioned to align the space therebetween with the space between the apertured portion of the second mentioned part to enable a disconnection of the coupling parts, and means for holding said plunger portions in a locking connection of said coupling parts.

10. In a coupling the combination of a connecting part having a strap attaching body and a transversely extending apertured extension, a second coupling part having an attaching body and a pair of relatively spaced portions apertured in aligning relation in intersection with the space therebetween, said space being sufficient to receive therein the apertured extension of the first mentioned coupling part to align the aperture thereof with the apertures of the second mentioned part, a pair of plunger portions reciprocably carried in the apertured portions of the second mentioned part and having a connection laterally removed from the aligning apertures of said part so that one of said plunger parts may be moved into a locking extension across the space between the said apertured portions of the second mentioned part in order to lock said parts together, said plungers being spaced so that they may be positioned to align the space therebetween with the space between the apertured portion of the second mentioned part to enable a disconnection of the coupling parts, means for holding said plunger portions in a locking connection of said coupling parts, a movable detent normally urged into position to hold the said plungers in a locking connection of the coupling parts, and plunger means for moving the said detent out of the path of the plunger portions to enable a release movement of the latter.

11. In a coupling the combination of a pair of coupling parts, locking means actuable from one end of the couplings for releasably connecting the parts, and detent means actuable from the other end of the coupling for normally inoperatively positioning the locking means.

12. In a coupling the combination of a pair of connector parts, spring actuated plunger means normally actuable into a locking relation of said parts and having an operating end positioned at one portion on said coupling, and detent means normally actuable to hold the plunger means in a locking position including an operating member positioned in opposed relation on the coupling with respect to the operating end of the plunger means.

13. In a coupling device the combination of a pair of coupling parts, locking means upon one of the parts normally actuable into locking position and including a depressible releasing plunger, safety means for the locking means including a detent normally actuable to hold the locking means in locking position notwithstanding an attempt to release the locking means by actuation of its plunger, said safety means including a plunger depressible for releasing the detent means in order to permit depression of the plunger of the locking means, said plungers of the locking means and safety means being in opposed relation so that they may be depressed simultaneously by relative movement towards each other.

14. In a coupling the combination of a pair of coupling parts, plunger means releasably connecting the parts together and movable in a predetermined direction to cause a release of the parts, and detent means to restrain operation of the plunger means and having an operating portion movable in a direction counter to the release movement of the plunger means in order to permit a release actuation of said plunger means.

15. In a coupling the combination of a pair of coupling parts, means for releasably hinging said parts to each other, and manually actuable detent means normally maintaining said first mentioned means against a release actuation of the coupling parts.

16. In a coupling construction the combination of a pair of relatively flat and thin complementary male and female connecting parts, and spring actuated plunger means maintaining said parts in releasably hinged relation.

17. In a coupling the combination of a pair of relatively flat and thin complementary connector parts, means for releasably hinging said parts to each other, and manually actuable detent means normally maintaining said releasable hinging means against the release actuation of the parts.

18. In an aeronaut's body harness coupling construction the combination of a pair of interfitting connector parts, releasable means hinging said parts together, and detent means normally maintaining said releasable means against release of the connector parts.

19. In an aeronaut's body harness coupling construction the combination of a pair of interfitting connector parts, depressible locking means for releasably hinging the parts together, and depressible detent means for restraining operation of the depressible locking means having an operating portion movable in counter direction to the depression of the locking means to permit the release of the said locking means.

20. In means to connect the two ends of an aviator's body harness strap or the like together the combination of a pair of connector parts, means to releasably connect the parts together in a hinged relation, and cooperative release detent means for the releasable hinging means.

21. In an aviator's body harness coupling the combination of coupling parts, and plunger means releasably hinging said parts together.

22. In a coupling the combination of coupling parts, means hinging said parts together, and a plunger device for actuating said means to permit facile connection and disconnection of said coupling parts.

23. In a coupling the combination of coupling parts, reciprocable plunger means hinging said parts together, spring means acting upon said plunger means to normally maintain the plunger means in hinging position of said parts, and means manually actuable to move said plunger means against its spring action to release said coupling parts.

24. In a coupling the combination of coupling parts, reciprocable plunger means hinging said parts together, spring means acting upon said plunger means to normally maintain the plunger means in hinging position with respect to said parts, means manually actuable to move said plunger means against its spring action to release said coupling parts, and manually controlled detent means normally preventing release actuation of said plunger means.

25. In an aviator's body harness coupling or the like, the combination of a pair of strap coupling parts having interfitting barrel portions, a plunger pin device in the barrel portions for releasably connecting said parts together in hinged relation, and a manually engageable portion actuable along the hinging axis to move the pin device for a release of the parts.

26. In an aviator's body harness coupling the combination of a pair of coupling parts each having a strap attaching portion and barrel portion, the latter for interfitting, pintle means releasably hinging said parts together at said barrel portions on a fixed axis and independently movable safetying detent means controlling the release operation of said pintle means.

27. In an aviator's body harness coupling the combination of a pair of coupling parts each having a strap attaching portion and a barrel portion, the latter for interfitting, pintle means for releasably connecting together the barrel portions to hinge said coupling parts together, and safetying detent means operable axially of the pintle means for controlling the release operation of said pintle means.

28. In an aviator's body harness coupling the combination of a pair of coupling parts each having a strap attaching portion and a barrel portion, the latter for interfitting, pintle means for releasably connecting together the barrel portions to hinge said coupling parts together, safetying detent means controlling the release operation of said pintle means, the pintle means being of the plunger type and having a depressible end extending axially beyond one end of the connected barrel portions and the detent means having an operating portion projecting beyond the opposite end of said barrel portions when assembled.

29. In a coupling the combination of a pair of coupling parts, reciprocable plunger means hinging said parts releasably together, and spring means acting upon the plunger means to normally maintain it in hinging position with respect to said parts.

HARVEY E. LAFAYETTE.